Mar. 6, 1923.

W. F. C. REIMERS.
FISH STRINGING DEVICE.
FILED FEB. 23, 1922.

1,447,429.

William F. C. Reimers, Inventor

By Samuel Herrick
Attorney

Patented Mar. 6, 1923.

1,447,429

UNITED STATES PATENT OFFICE.

WILLIAM F. C. REIMERS, OF PAULLINA, IOWA.

FISH-STRINGING DEVICE.

Application filed February 23, 1922. Serial No. 538,787.

*To all whom it may concern:*

Be it known that I, WILLIAM F. C. REIMERS, a citizen of the United States, residing at Paullina, in the county of O'Brien and State of Iowa, have invented certain new and useful Improvements in Fish-Stringing Devices, of which the following is a specification.

This invention relates to a fish stringing device and it has for its object to provide a fish stringing element adapted to be used in conjunction with the device of my Patent Number 1,407,221 issued on the 21st day of February, 1922. It is an object of the invention to so construct the fish stringing element that it may be made of wire and stamped metal and turned out very rapidly and at a comparatively small cost while at the same time the resultant structure will be of such a nature as to preclude the possibility of the fastener becoming unfastened with a consequent loss of the fish.

Further objects and advantages of the invention will be set forth in the detailed description which follows.

In the accompanying drawing.

Like numerals designate corresponding parts throughout the several figures of the drawing.

Figure 1:
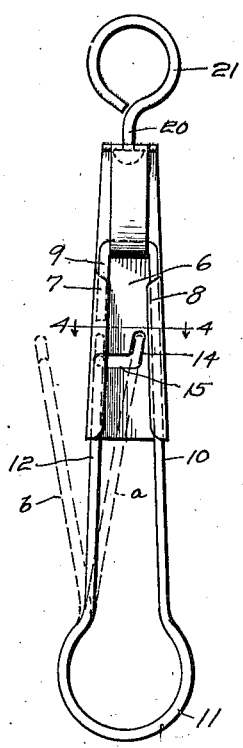
Fig. 1 is a front elevation of a fish stringing element constructed in accordance with the invention.
Figure 2:
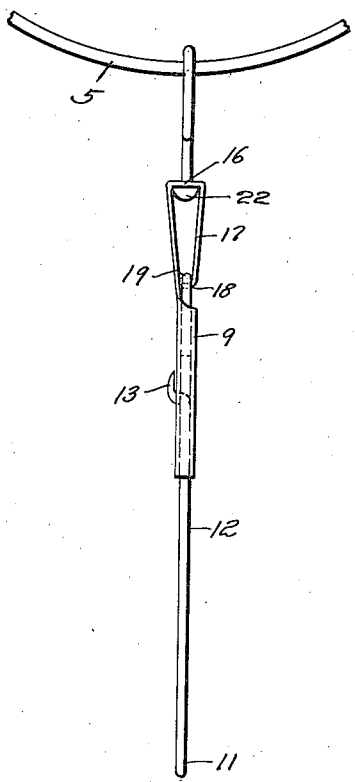
Fig. 2 is an edge elevation thereof.
Figure 3:
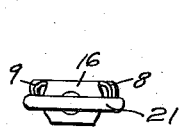
Fig. 3 is a plan view thereof.
Figure 4:
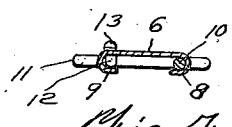
Fig. 4 is a horizontal sectional view upon line 4—4 of Fig. 1.

In the drawing 5 designates an annular element corresponding to that shown in my patent aforesaid which element receives a plurality of fish stringing devices. These devices according to the present invention comprise a sheet metal plate 6 having its edges turned over at 7 and 8 to engage the portions 9 and 10 of a wire which is bent to looped formation at 11. The free end of the wire, indicated at 12, has an offset terminal end 13 which is adapted, when the portion 12 of the wire is pressed inwardly to the position indicated at $a$, Fig. 1, to pass through the portion 14 of a slot 15 formed in the metal plate 6. When this wire is released it springs, under its own resiliency, to the full line position, illustrated in Fig. 1 where the offset end 13 engages beneath the underside or rear side of the plate 6 and, additionally, that part of the wire adjacent said offset end is engaged beneath the overturned portion 7 of the plate 6.

When a fish is to be strung upon the wire, the wire is pressed upon at 12 to spring it to the position $a$. It is then pressed laterally to disengage the offset end 13 from the slot 15 and when released springs to the position $b$, Fig. 1, at which time the point 13 and the part 12 of the wire may be passed through the gills of a fish in the usual way. The wire 12 is then returned to the full line position in Fig. 1. The upper end of the metal of the plate 6 is bent to form a horizontal portion 16 and is then bent downwardly at 17 and its free end is engaged at 18 beneath a transverse connecting portion 19 of the wire. A stem 20 of an eye 21 rotates in the horizontal portion 16 of the metal plate and is headed beneath said portion, as indicated at 22. The result is to swivel the eye with respect to the remainder of the structure so that the stringing element of Fig. 1 may turn freely with respect to the shank 20. Thus the fish, in its struggles to free itself, cannot bring the stringing element to such a point as to resist its twisting movements.

It is to be understood that the invention is not limited to the precise construction set forth but that it includes within its purview whatever changes fairly come within either the terms or the spirit of the appended claims.

Having described my invention what I claim is:

1. A stringing element of the character described comprising a metallic plate, a wire engaged and retained by bent portions of said plate and comprising a loop and a free end, an offset upon the free end of the wire and a slot in the plate adapted to be engaged by said offset end of the wire, said slot comprising a transverse portion and a connected longitudinally extending portion with which the offset end of the wire aligns when the free end of the wire is pressed inwardly and through which said free end may be disengaged from the plate.

2. A structure as recited in claim 1 in combination with a bent over edge upon the plate with which the wire aligns when said wire is released and is permitted to move outwardly.

3. A structure as recited in claim 1 wherein said metal plate is bent over at its upper end to form a loop and an eye having swiveled engagement in said loop.

4. A structure as recited in claim 1 wherein the upper end of the metallic plate is bent over to form a loop the terminal end of said bent over portion engaging said wire, an eye, a shank mounted to turn in said loop and a head upon the shank within the loop whereby the eye is swiveled with respect to said plate.

In testimony whereof I affix my signature in the presence of two witnesses.

WILLIAM F. C. REIMERS.

Witnesses:
   Geo. Raw,
   J. T. Metcalf.